April 27, 1954  J. S. PAGE  2,676,611
FLUID PRESSURE TRIP CONTROLLED EMERGENCY SHUTOFF VALVES
Filed Aug. 15, 1949  3 Sheets-Sheet 1
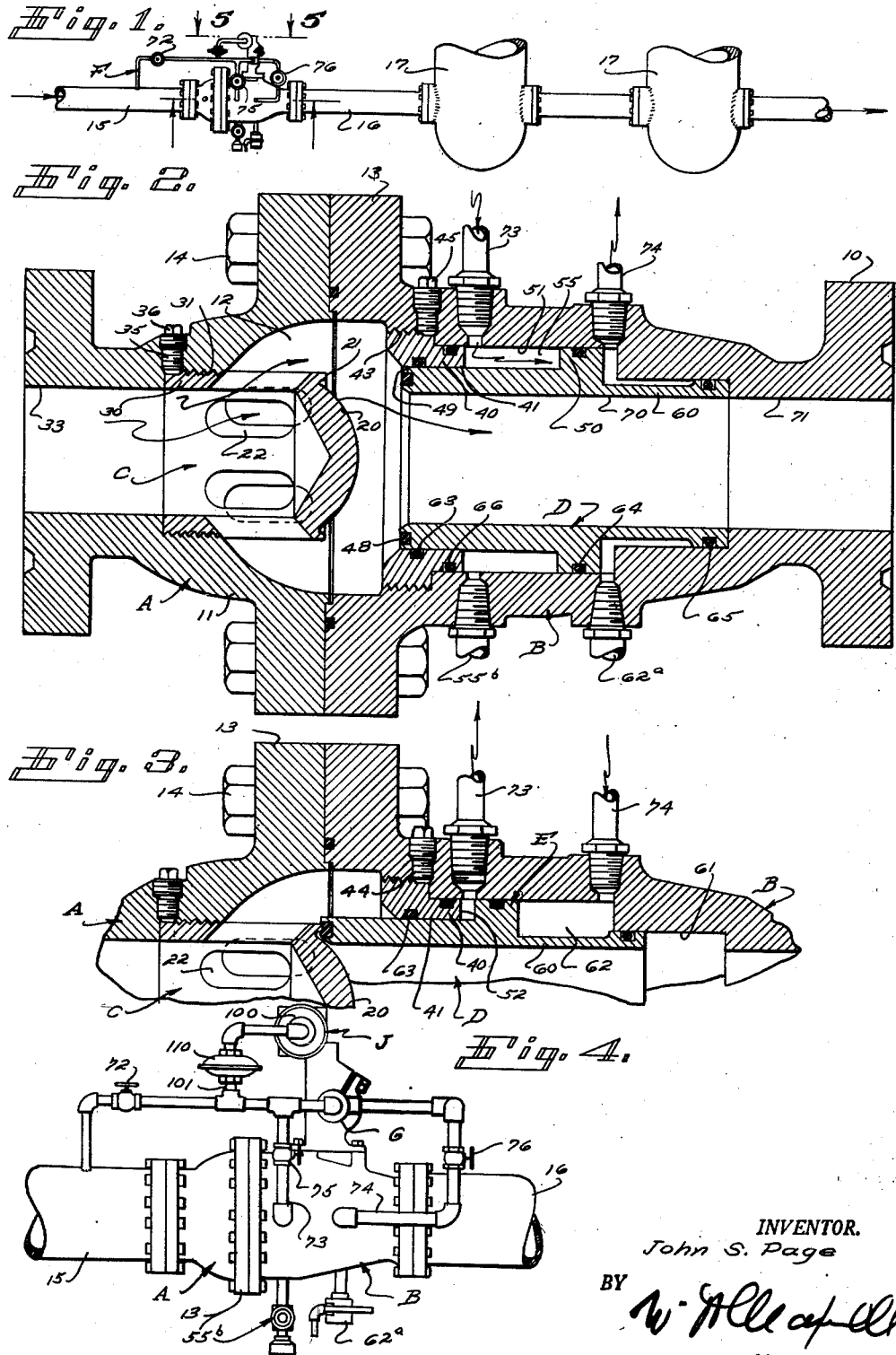
INVENTOR.
John S. Page

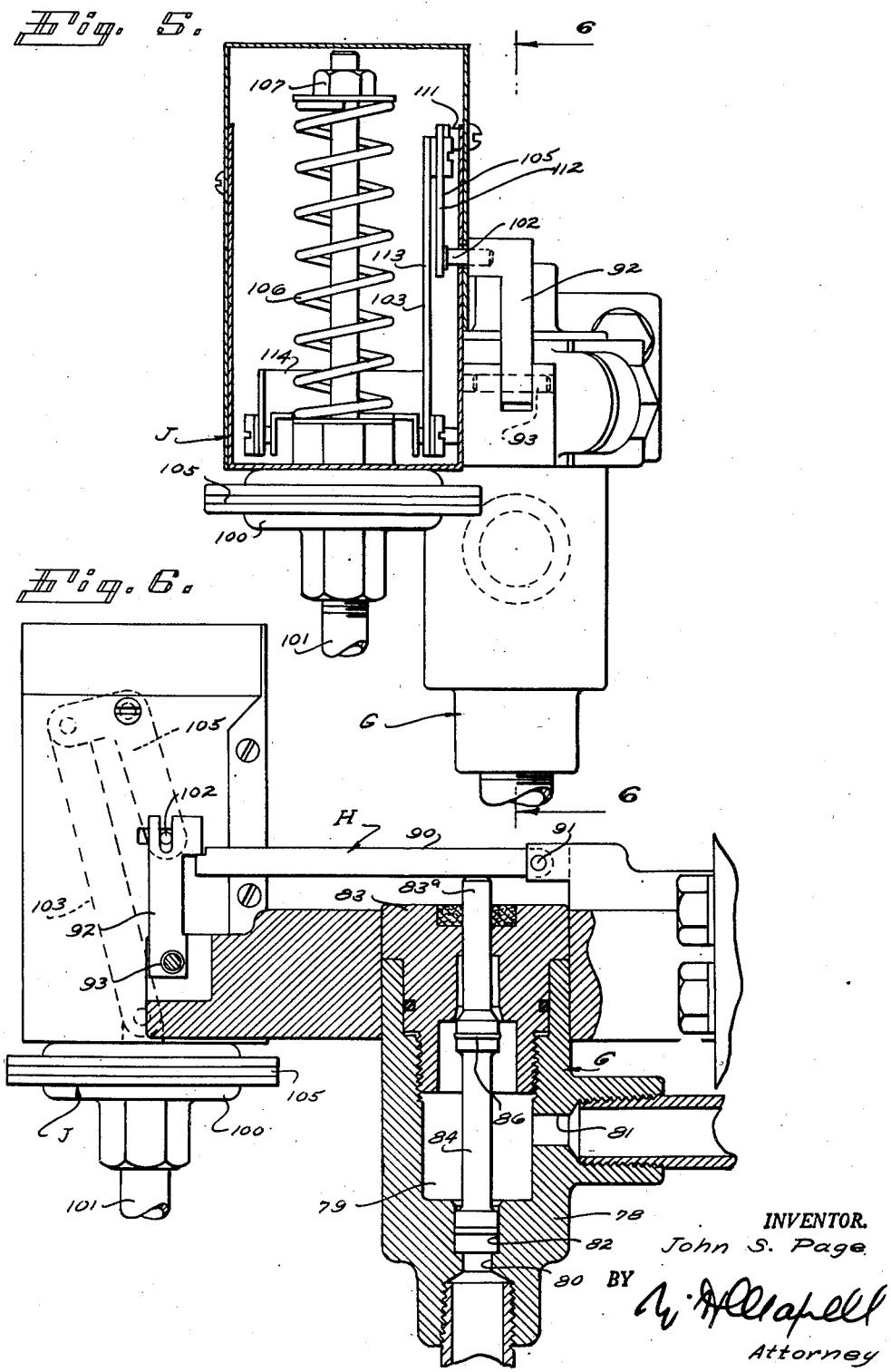

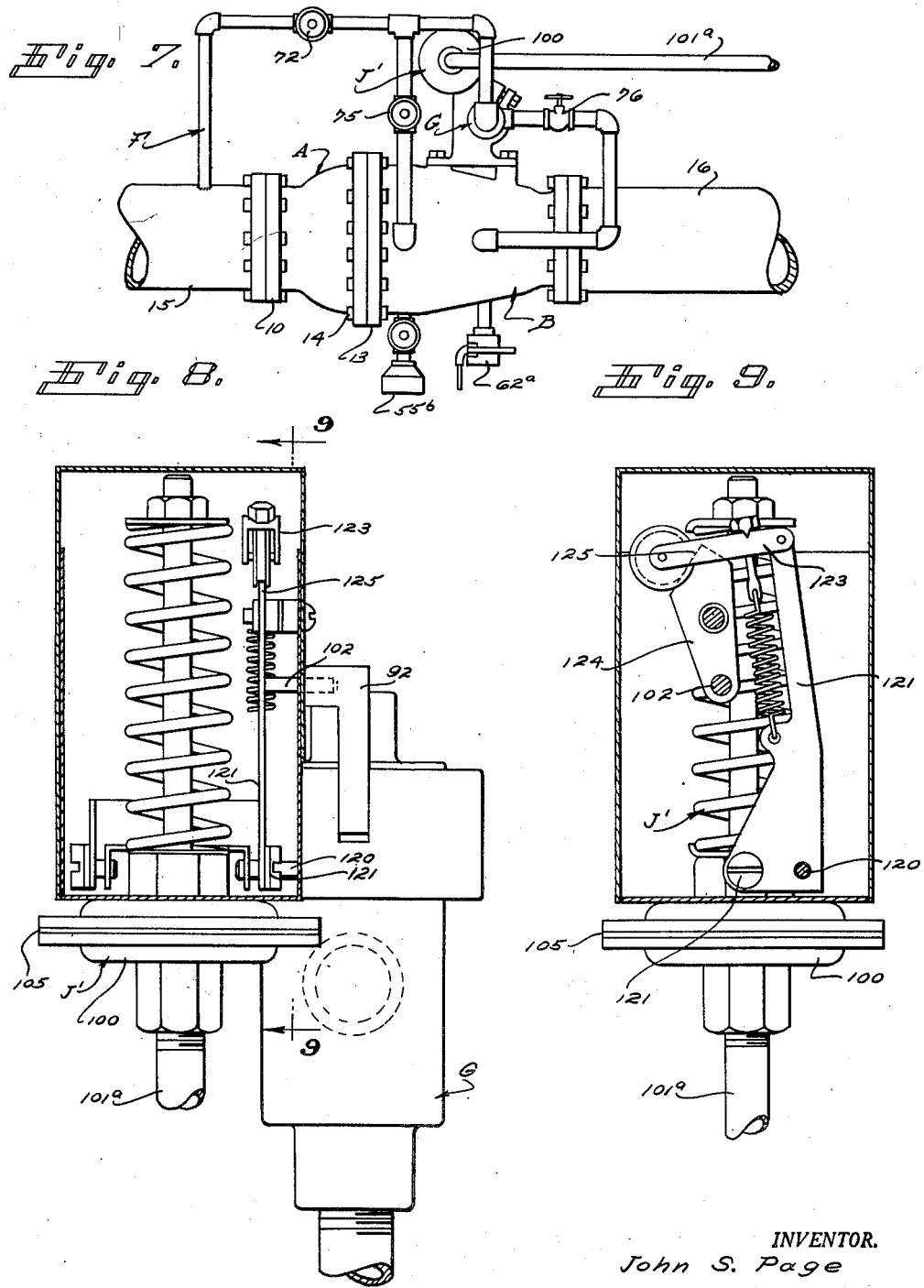

Patented Apr. 27, 1954

2,676,611

UNITED STATES PATENT OFFICE 2,676,611

FLUID PRESSURE TRIP CONTROLLED EMERGENCY SHUTOFF VALVES

John S. Page, Long Beach, Calif., assignor, by mesne assignments, to Fluidal Valves, Inc., Long Beach, Calif., a corporation of California Application August 15, 1949, Serial No. 110,326

8 Claims. (Cl. 137—461)

This invention is concerned with a shut-off valve to be used in a pipe line, or the like, and it is a general object of the invention to provide a simple, practical, dependable and effective shut-off valve which is normally held open by the pressure of fluid being handled by the valve and which is controlled by fluid pressure, either pressure of the fluid being handled by the valve or by pressure handled by a control line, so that it closes when such pressure varies beyond a predetermined value.

The valve of the present invention, in its preferred form, involves an elongate tubular body, enlarged intermediate its ends to form a chest, and it is preferably split or divided at the chest so that it is sectional, the two sections being joined by a releasable fastening means. A seat member is carried by one section to project into the chest and is preferably an annular or cylindrical laterally ported projection closed at its outer end by an end wall or plug and having an annular seat at its outer end. A shiftable closure is slidably carried by the other section of the body, being preferably slidable in a guide carried by said other section of the body, and it is movable between an open position where it is removed from the seat and is held by the pressure of the fluid being handled by the valve and a closed position where it engages and seals with the seat.

Means is provided in the valve for operating the shiftable closure, which means preferably involves a piston on the closure operating in a cylindrical opening establishing an annular chamber at one side of the piston. An extension or sleeve-like part is provided on the piston and operates in a cylinder opening establishing an annular chamber at the other side of the piston, the last mentioned annular chamber being of greater cross-sectional area than the one first mentioned.

A control system in accordance with one form of the invention involves a pressure line receiving fluid under pressure from the upstream side of the valve and having branches, one connected to the first mentioned or small chamber and the other connected to the second or large chamber. A control valve is provided in said other branch of the pressure line and is preferably a plug-type valve normally closed and normally urged open by pressure in the line. A latch means normally releasably holds the control valve closed and a pressure responsive means controls the latch means and serves to release it when pressure in the pressure line exceeds a predetermined value. The pressure responsive means is preferably a diaphragm mechanism subject to line pressure normally held unactuated by an adjustable spring and having a shiftable member operatively coupled with the latch through a suitable drive.

A valve normally closes the branch of the pressure line that extends to the small chamber and a valve controlled bleed is provided to normally vent the small chamber to atmosphere. A second vent is provided for the large chamber and has a valve which is normally closed.

Another form of the invention provides for operating the valve from a remote point and independently of the line pressure. A control line extends to the diaphragm mechanism from any desired point and the diaphragm mechanism is related to the control valve so that the control valve is unlatched and open when a predetermined drop in pressure occurs in the control line.

A general object of the present invention is to provide a valve of the general character referred to which is simple in form and construction and which is highly effective and dependable in operation. The valve of the present invention involves but few simple, easily formed parts which are easily assembled or arranged together.

Another object of the invention is to provide a valve of the character referred to in which the parts subject to wear, failure, or deterioration are readily removable for repair or replacement.

It is a futher object of the present invention to provide a valve of the general character in which the shiftable or operating closure of the valve is formed as a unit with the shiftable or working parts of the operating means that operates the closure, to the end that the construction is free of complicated connections, couplings, or like parts subject to failure or deterioration.

Another object of the invention is to provide a valve of the general character referred to with a control system which acts to reliably control operating fluid so that the valve closes without fail when the pressure relied upon for control varies in pressure in a predetermined manner.

The various objects and features of my invention will be fully understood from the following detailed description of typical preferred forms and applications of the invention, throughout which description reference is made to the accompanying drawings, in which:

Fig. 1 is a side elevation of a typical installation in which the valve of the present invention is included, the structure of the present invention being shown in a pipe line extending to units of equipment. Fig. 2 is an enlarged longitudinal detailed sectional view of the valve provided by the present invention showing the closure of the valve in a fully open position. Fig. 3 is a view similar to a portion of Fig. 2 showing the closure of the valve in the fully closed position. Fig. 4 is a detailed view illustrating parts of the drive or mechanism that couples the diaphragm and the element which controls the latch included in the control system. Fig. 5 is an enlarged plan view taken as indicated by line 5—5 on Fig. 1. Fig. 6 is a sectional view taken as indicated by line 6—6 on Fig. 5. Fig. 7 is an enlarged view similar to Fig. 4 showing another form of construction. Fig. 8 is an enlarged view of a part of the structure shown in Fig. 7, parts being shown in section. Fig. 9 is a sectional view taken on line 9—9 of Fig. 8.

The structure provided by the present invention involves, generally, a main valve and a control system combined with and controlling the main valve. The valve involves, generally, a body, preferably formed of sections A and B, a seat member C in one section, a shiftable closure D in the other section, means E operating the closure and a pressure line F conducting pressure from the upstream side of the valve to the means E. The control system involves, generally, a control valve G in the pressure line, latch means H normally releasably holding the control valve closed, and pressure responsive means J controlling the latch means H.

The body of the valve formed by the sections A and B is an elongate tubular part with pipe connecting means 10 at its ends and it is preferably enlarged intermediate its ends as at 11, to form what I will term a chest 12. The body of the valve is preferably divided into the two sections A and B at the point where the enlargement or chest occurs, and in practice it is advantageous to releasably couple the body sections A and B, as by flanges 13 joined by releasable fasteners 14. In the particular application of the invention illustrated in the drawings the section A of the body is connected to the upstream section 15 of a pipe line while the body section B is connected to the downstream section 16 of such line. The line is shown supplying fluid to units 17 of equipment which are to be protected against excessive pressure.

The seat member C of the valve is carried by one section, for instance, it may be carried by the section A, and it is so mounted or carried as to extend into the chest 12. In the preferred form of the invention the seat member C is a tubular or cylindrical part that projects from section A into the chest 12 where its free or projecting end is closed by an end wall or cap 20. An annular seat 21 is provided at the free or projecting end of the seat member and a plurality of apertures or ports 22 is provided laterally in the seat member so that fluid entering body section A from the pipe line section 15 flows through the seat member and into the chamber 12, as indicated by the arrow in Fig. 2.

In the preferred form of the invention the seat member is detachable or releasable from the body section A so that it can be renewed or replaced as desired. In the case illustrated the seat member has a threaded base part 30 which is threaded into a suitable opening 31 in the body A. It is preferred that the parts be formed and related so that the opening 32 in the seat member is of the same size and is concentric with the opening 33 in the body section A, as clearly shown in Figs. 2 and 3 of the drawings. The invention provides means for locking or setting the seat member in position in the body section A and in the case illustrated the lock means involves a set screw 35 threaded in a lateral opening in body section A and a lock screw 36 likewise threaded in the opening and bearing on the set screw 35.

The shiftable closure D is preferably a simple cylindrical or sleeve-like part slidably carried in the body section B to be shiftable longitudinally therein between an open position where it is removed from seat 21 and a closed position where it is in engagement with the seat 21. The seat 21 is preferably concentric with the longitudinal axis of the valve and it is preferred that the closure D be mounted so that it is concentric with seat 21.

The invention provides suitable means for mounting the closure D in the body section B so that it slides or reciprocates in the desired manner. In the form of the invention illustrated the mounting means for the closure E involves a guide 40 carried in the body section B adjacent the chest 12. The guide has a bore or guide opening 41 slidably carrying the closure. In the preferred form of the invention the guide 40 is formed separate from the body section B and is connected thereto by a suitable threaded connection at 43. When this construction is employed the invention provides lock means for securing the guide 40 in body section B. The lock means shown in the drawings involves a set screw 44 carried in a lateral opening in the body section B and a lock screw 45 is carried in said opening and holds the set screw.

In the preferred form of the invention suitable sealing means is provided to establish a fluid-tight seal between the seat 21 and the closure member D when the closure member is in the closed position, as shown in Fig. 3. In the case illustrated the sealing means involves a sealing ring 48 carried in an annular channel or recess 49 provided in the end of the closure D that cooperates with the seat 21.

The means F provided for operating the closure is a fluid pressure operated means and is preferably of the cylinder and piston type. In the case illustrated a piston 50 is provided on the sleeve or closure D at the end remote from that which engages the seat 21. The piston 50 projects radially outward from the sleeve closure and is slidably carried in a cylinder opening 51 provided in the body section B, the cylinder opening 51 being concentric with the longitudinal axis of the valve. In the preferred arrangement the cylinder 51 is located in the body section B inward of or beyond the inner end 52 of the closure guide 40. The cylinder 51 is somewhat larger in diameter than the sleeve-like closure D so that there is an annular chamber 55 established between the exterior of the closure and the wall of the cylinder 51. This chamber is closed at one end by the piston 50 and at the other end by the end 52 of the guide 40.

A valve controlled bleed 55$^b$ is provided having connection with the chamber 55. The bleed 55$^b$ is normally open so that atmospheric pressure prevails in the chamber 55.

A sleeve-like extension 60 is provided on the piston 50 at the side opposite or away from the closure D. The exterior or outside of sleeve extension 60 is considerably smaller in diameter than the closure D and is slidably engaged in cylinder opening 61 provided in the body section D, as clearly shown in Figs. 1 and 2. Through the relationship of parts just described a second annular chamber 62 is provided in the structure between the exterior of the sleeve extension 60 and the wall of cylinder 51. From the drawings it will be observed that the second chamber is substantially larger in area than the chamber first described.

A valve controlled bleed 62ª is provided having connection with the large chamber 62 and under normal conditions this bleed is closed.

The unit formed by the sleeve-like closure D, the piston 50 and the sleeve extension 60 shifts or operates in the body section B and is the only shiftable or working part of the valve proper. Under normal operating conditions the pressure of fluid being handled by the valve acts on the end of the closure at the chest and holds the closure in the full open position. It is preferred in practice that suitable sealing means be provided between the shiftable unit above referred to and the parts with which it is related. In the drawings I have shown a suitable seal 64 between the piston 50 and the cylinder 51, and a suitable seal 65 between the sleeve extension 60 and the cylinder 61. In the case illustrated a seal 66 is also provided between the guide 40 and the body part in which it is carried. In practice it is preferred that the closure D, piston 50 and sleeve extension 60 form a unit having an opening 70 extending continuously through it from one end to the other and the opening 70 is preferably of the same size and is concentric with the opening 71 in body section B.

The pressure line F receives fluid at the upstream side of the valve and in the case illustrated it is shown receiving fluid from the pipe section 15 which connects with body section A. A suitable stop valve 72 is provided in the receiving portion of the line F and in accordance with the present invention the line has two branches, a first branch 73 which connects with the chamber 55 and a second branch 74 which connects with the chamber 62. In the drawings suitable stop valves 75 and 76 are shown in the branches 73 and 74 so that these elements can be closed whenever desired. The valve 75 controlling flow to the small chamber 55 is normally closed, while valve 76 controlling flow to the large chamber is normally open.

The control valve G of the control system is located in the branch 74 of the pressure line F and it is such as to normally close branch 74.

The control valve G as shown in the drawings involves a body 78 having a chest opening 79, an inlet port 80, an outlet port 81, a cylindrical opening 82 between the inlet port 80 and the chest 79 and a removable cap 83. A plug 84 is slidably carried in the cylinder opening 82 and normally closes that opening while a stem 83ª projects from the plug and extends through the cap 83 to project at the exterior of the valve. A closure or seal 86 is provided on the stem to have sealing engagement with the cap 83 when the plug 84 is operated to a position where it is out of the cylinder opening 82 and in the chest 79.

The pressure received from the pipe section 15 is communicated by the pressure line F to the inlet port 82 of valve G and normally acts on the plug 84 tending to move it into the chest 79. When the plug is released for operation the pressure acting on the plug moves it into the chest with the result that the inlet port 80 is connected with the outlet port 81 through the chest 79. The outlet port 81 is in communication with the chamber 62. When the pressure handled by the pressure line F is admitted by valve G to the annular chamber 62 of the valve it acts, urging it toward the seat 21, and consequently the closure D operates toward the seat member until it engages the seat 21 and thus closes the valve.

The latch means H as shown in the drawings is a simple mechanical control or device releasably holding the stem 83ª of valve G in or in such position that the plug 84 is in the cylinder 82 closing the valve G. In the case illustrated the latch means H involves a lever 90 pivoted at 91 and engaging the outer or projecting end of stem 83ª as clearly shown in Fig. 6 of the drawings. A control latch 92 pivoted at 93 has latching engagement with the outer end of lever 90 and when in the position shown in Fig. 6 it holds the lever 90 in position where the stem 83ª is held in. The latch 92 when swung to the left from the position shown in Fig. 6 becomes disengaged from the lever 90, in which case the pressure tending to open the valve G causes the valve to open resulting in the action above described.

The pressure responsive means J shown in Figs. 4, 7, 8, and 9 of the drawings provided for controlling the latch 92 of means H by pressure of the fluid to be controlled by the main valve involves, generally, a diaphragm unit 100 supplied with pressure through a line 101 branching from the pressure line F, a shiftable member 102 which is engaged with the latch 92 so that the latch is moved away from the lever 90 when the member 102 is operated to the left in Fig. 6, and a suitable drive connection 103 between the diaphragm unit 100 and the member 102. If the pressure in the line controlled by the main line is high enough it may be desired to employ a pressure reducing valve or fitting 110 in the line 101.

In the case illustrated the diaphragm 105 of the unit 100 is normally held unactuated by a spring 106, the action or pressure of which may be adjusted through a suitable adjusting nut 107.

The drive connection 103 that operatively connects the diaphragm unit 100 and the member 102 is such as to cause operation of member 102 as the diaphragm operates against the resistance of spring 106.

In practice any suitable operating or driving connection may be provided between the diaphragm and the member 102. In the case illustrated this connection, as shown in Fig. 5, involves, generally, a bell crank pivoted at 111 and having an arm 112 carrying the member 102. The other arm 113 of the bell crank is connected with the diaphragm by a link 114.

From the foregoing description it will be apparent that when the diaphragm 105 is moved a predetermined amount against the resistance of the spring 106 the latch 92 is operated by the member 102 so that it is released from lever 90. When lever 90 is released valve G opens and as soon as valve G opens pressure is admitted to the main valve causing the closure D to move to the closed position where it is in engagement with seat 21. It will be apparent that by suitable adjustment of the means J, that is, by suitably adjusting nut 107 the action of the diaphragm unit 100 can be varied so that the action just described occurs when a predetermined pressure develops in the pressure line F, which pressure will, of course correspond with that in the pipe line section 15.

When it is desired to open the main valve the valve 72 may be closed and bleed 62ª opened. The pressure in the main valve will then open the closure. Should it be desired to open the main valve by pressure, after valve 76 has been closed and the bleed 62a has been opened, the bleed 55a may be closed and the valve 75 opened so pressure acts in the small chamber 55 while the large chamber is open to atmosphere. Pressure in chamber 55 acting on piston 50 will open the closure.

When the structure is operated as above described the latch means H is manually operated or reset, which resetting of the latch means causes closing of the valve G, whereupon the whole structure may be reestablished for automatic operation as above described.

In the form of the invention shown on sheet 3 of the drawings the diaphragm mechanism of the pressure responsive means J' is actuated or controlled by pressure from a control line 101a that extends to any suitable point remote from the main valve. In this case the diaphragm mechanism is so related to the latch means that the latch is released when a predetermined drop of pressure occurs in the control line 101a. The drive from or between the diaphragm and the member 102 that operates the latch 92 is shown as a quick action or snap mechanism in which a bell crank is pivoted at 120 and has an arm 121 that is operated by the diaphragm. The outer arm 121 of the bell crank carries a spring pressed trip 123 that engages one end of a pivoted lever 124 so that as pressure drops in the control line the diaphragm moves until the trip 123 passes over the point 125 at the said end of the lever 124, whereupon the lever is quickly operated or pivoted. Lever 124 is shown carrying the member 102 so that when lever 124 operates as just described the latch is operated by member 102.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. In combination, a main valve body having an annular seat therein, a tubular closure in the body conducting fluid from one end to the other and having an end operable into and out of engagement with the seat, and fluid pressure means in the body surrounding the closure and operating the closure and including a piston operating in a cylinder, a pressure line supplying operating fluid to the piston, a control valve in said line urged open by pressure in the line, a latch controlled lever normally holding the said valve closed, and a pressure responsive means operating to actuate the latch and release the said lever.

2. In combination, a valve body with a cylinder portion and having an annular seat therein, a tubular closure in the body conducting fluid from one end to the other and having an end operable into and out of engagement with the seat, fluid pressure means in the body operating the closure and including a piston surrounding the closure and operating in the cylinder portion of the body, the cylinder portion of the body being closed at both ends, a pressure line with branches selectively supplying pressure to the two sides of the piston, a control valve in one of said branches urged open by pressure in the said branch when in the closed position, a mechanical latch normally holding the said valve closed, and a pressure responsive means operating to release the said latch.

3. In combination, a valve body with a cylinder portion and having a seat therein, a closure sleeve in the body open at both ends for passage of fluid from one end of the sleeve to the other and having an end operable into and out of engagement with the seat, fluid pressure means in the body operating the closure and including a piston on and surrounding the closure and operating in the cylinder portion of the body, the cylinder portion of the body being closed at both ends, a pressure line with branches supplying pressure to the two sides of the piston, a control valve in one of said branches urged open by pressure in the said branch when in the closed position, a mechanical latch normally holding the said valve closed, and a pressure responsive means operating to release the said latch and including a diaphragm, a member engaging the latch, and an operating connection between the diaphragm and the said member.

4. In combination, a valve body having a seat therein, a closure in the body operable into and out of engagement with the seat, fluid pressure means in the body operating the closure and including a piston operating in a cylinder closed at both ends, a pressure line with branches supplying pressure to the two sides of the piston, a control valve in one of said branches urged open by pressure in the said branch when in the closed position, a mechanical latch normally holding the said valve closed, and a pressure responsive means operating to release the said latch and including a diaphragm, a member engaging the latch, and an operating connection between the diaphragm and the said member, the control valve having a plug closure carried by a stem which is under control of the latch, and a control valve in the other branch of said line.

5. A valve of the character described including, an elongate body with a cylinder portion, an annular seat, a support carrying the seat centrally in the body, the seat and support being spaced from the cylinder portion longitudinally of the body, an imperforate flow conducting sleeve closure open at both ends, the interior of the closure being unrestricted for free passage of fluid through the closure from one end to the other, the closure being slidable in the body for movement of one end of the closure into and out of engagement with the seat, and operating means for the closure including, a piston on the exterior of the closure operating in the cylinder portion of the body and establishing a closed annular chamber in the cylinder portion at one side of the piston, the closure having an extension projecting longitudinally of the body and operating in the body and establishing a second closed annular chamber at the opposite side of the piston and of greater area than the chamber first mentioned, and a pressure line supplying operating fluid to said chambers.

6. A valve of the character described including, a tubular body with a cylinder portion intermediate its ends, an annular seat in one end portion of the body and facing the cylinder portion, a support held in said end portion of the body and supporting the seat centrally in the body, a tubular sleeve closure open at both ends and having its interior unrestricted to pass fluid from one end of the closure to the other, a guide in the body slidably supporting the closure in the body for movement of an end of the closure into and out of engagement with the seat, and operating means for the closure including, a piston on the closure operating in the cylinder portion of the body and establishing an annular chamber at one side of the piston around the closure and between the piston and the guide, the piston having an extension projecting therefrom longitudinally of the body and operating in the other end portion of the body and establishing a second annular chamber at the opposite side of the piston and of greater area than the chamber first mentioned, means selectively venting said chambers, and means selectively delivering operating fluid to said chambers.

7. A valve of the character described including, an elongate tubular body having end portions and an enlarged part intermediate its end portions and forming a chest between the end portions of the body, an annular seat member carried by the body and projecting from one end portion of the body into the chest and having an annular seat at its projecting end faced in the direction in which the seat member projects, an open ended flow conducting sleeve closure in the body coaxial with the seat member and in end to end arrangement relative thereto, the closure having an end shiftable into and out of engagement with the seat, the closure conducting flow from the other end portion of the body to the chest when the valve is open, and operating means for the closure including a piston on the closure operating in a cylinder in the said other end portion of the body and establishing an annular chamber at one side of the piston and having an extension operating in the said other end portion of the body and establishing a second annular chamber at the opposite side of the piston and of greater area than the chamber first mentioned, and means selectively supplying operating fluid to said chambers.

8. A valve of the character described including, a body having two separable sections, one having a cylinder portion and the other having a seat therein, an unobstructed sleeve closure open at both ends for the passage of fluid through the closure, a guide threaded in the first mentioned section of the body at one end of the cylinder portion and slidably supporting the closure in the body with one end movable into and out of engagement with the seat, and operating means for the closure including, a piston on the closure operating in said cylinder portion and establishing an annular chamber at one side of the piston around the closure and between the piston and the guide, the piston having an extension operating in the body adjacent the other end of the cylinder portion and establishing a second annular chamber at the opposite side of the piston and of greater area than the chamber first mentioned, means selectively venting said chambers, and means selectively supplying operating fluid to said chambers.

References Cited in the file of this patent

UNITED STATES PATENTS

| Number | Name | Date |
|---|---|---|
| 994,431 | Unger | June 6, 1911 |
| 1,348,956 | Pokorny | Aug. 10, 1920 |
| 1,477,722 | Slattery | Dec. 18, 1923 |
| 1,604,221 | Dunford | Oct. 26, 1926 |
| 1,631,482 | Gfeller | Jan. 7, 1927 |
| 1,731,184 | Thomas | Oct. 8, 1929 |
| 1,752,439 | Larner | Apr. 1, 1930 |
| 1,764,521 | Mullaney | June 17, 1930 |
| 1,869,345 | Vallendor | July 26, 1932 |
| 1,925,531 | Grunsky | Sept. 5, 1933 |
| 2,081,542 | Kidney | May 25, 1937 |
| 2,124,619 | Kerr | July 26, 1938 |
| 2,192,499 | Larner | Mar. 5, 1940 |
| 2,416,787 | White | Mar. 4, 1945 |
| 2,396,815 | Blum | Mar. 19, 1946 |
| 2,416,787 | White | Mar. 4, 1947 |

FOREIGN PATENTS

| Number | Country | Date |
|---|---|---|
| 850,567 | France | Sept. 18, 1939 |